(12) United States Patent
Dilje et al.

(10) Patent No.: US 10,781,858 B2
(45) Date of Patent: Sep. 22, 2020

(54) UNIT INCLUDING A ONE-PIECE RETAINING ELEMENT, AND A BEARING UNIT, RETAINING ELEMENT, AND METHOD

(71) Applicant: Aktiebolaget SKF, Gothenburg (SE)

(72) Inventors: Alexander Dilje, Schweinfurt (DE); Juergen Barthelme, Frankenwinheim (DE); Riad Bauch, Gerbrunn (DE); Helmut Hauck, Euerbach (DE); Stefanie Seufert, Rothhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 404 days.

(21) Appl. No.: 15/685,029

(22) Filed: Aug. 24, 2017

(65) Prior Publication Data

US 2018/0066708 A1    Mar. 8, 2018

(30) Foreign Application Priority Data

Sep. 6, 2016   (DE) .................... 10 2016 216 805 U

(51) Int. Cl.
  *F16C 33/58*  (2006.01)
  *F16C 35/04*  (2006.01)
  *F16C 35/067*  (2006.01)

(52) U.S. Cl.
  CPC .......... *F16C 33/586* (2013.01); *F16C 35/042* (2013.01); *F16C 35/045* (2013.01); *F16C 35/067* (2013.01); *F16C 2226/76* (2013.01)

(58) Field of Classification Search
  CPC ...... F16C 35/04; F16C 35/042; F16C 35/045; F16C 35/047; F16C 35/06; F16C 35/067
  See application file for complete search history.

(56) References Cited

U.S. PATENT DOCUMENTS 6,241,257 B1 *  6/2001  Hauck ............... F16C 13/006
                                                277/637
6,357,926 B1 *  3/2002  Hauck ............... F16C 13/006
                                                384/546

(Continued)

FOREIGN PATENT DOCUMENTS

CN    103328843 A    9/2013
CN    204140665 U    2/2015

(Continued)

OTHER PUBLICATIONS

Office Action and Search Report from the Chinese Patent Office dispatched Mar. 25, 2020 in related Chinese application No. 201710701810.3, and translation thereof.

*Primary Examiner* — Daniel J Wiley
(74) *Attorney, Agent, or Firm* — J-Tek Law PLLC; Scott T. Wakeman; Mark A. Ussai

(57) ABSTRACT

A retaining element configured to retain an outer ring of a bearing in a housing, the retaining element having a body having a first side and a second side and a substantially circular through-hole extending from the first side to the second side and an axial thickness from the first side to the second side. A boundary of the through-hole includes two or fewer recesses. The retaining element is configured to hold an attachment element in the two or fewer recesses, the attachment element being configured to engage a groove in a bearing to hold the bearing in the retaining element.

12 Claims, 5 Drawing Sheets

(56) References Cited

U.S. PATENT DOCUMENTS

| | | | |
|---|---|---|---|
| 2001/0012418 A1* | 8/2001 | Buchheim | F16C 19/54 384/537 |
| 2012/0207416 A1* | 8/2012 | Beyfuss | F16C 35/04 384/445 |
| 2012/0314986 A1* | 12/2012 | Bitzl | F16C 19/54 384/584 |
| 2014/0064651 A1 | 3/2014 | Beyfuss et al. | |

FOREIGN PATENT DOCUMENTS

| | | |
|---|---|---|
| CN | 105864300 A | 8/2016 |
| DE | 10329433 A1 | 1/2005 |
| DE | 10326433 B3 | 2/2005 |
| DE | 10355363 B4 | 9/2005 |
| DE | 102005012323 B3 | 6/2006 |
| DE | 102004031830 | 6/2012 |
| JP | 2008267585 A | 11/2008 |
| JP | 2011236922 A | 11/2011 |
| JP | 2011257009 A | 12/2011 |

* cited by examiner

UNIT INCLUDING A ONE-PIECE RETAINING ELEMENT, AND A BEARING UNIT, RETAINING ELEMENT, AND METHOD

CROSS-REFERENCE

This application claims priority to German patent application no. 10 2016 216 805.3 filed on Sep. 6, 2016, the contents of which are fully incorporated herein by reference.

TECHNOLOGICAL FIELD

The disclosure is directed to a retaining element for securing the outer ring of a bearing in an opening.

BACKGROUND

From DE 10 2004 031 830 A1 a unit is known, which includes a relevant retaining element and a bearing. The outer ring of the bearing comprises a groove in its outer surface, into which three lug-shaped regions of the retaining element engage such that the retaining element is secured on the bearing in an axial direction. Furthermore an attaching of a bearing to a retaining element using a shaft ring is known from JP 2011-236922 A. Furthermore in the patent literature there are the further documents DE 10 2004 031 830, DE 10355363, DE 10 2005 012 323, JP 002011-236922 A, JP 2008-267585 A, JP 2011-257009 A, which are dedicated a similar topic.

SUMMARY

An aspect of the disclosure provides a unit of the above-described type, which guarantees a very reliable attaching of the bearing to the retaining element and which is cost-effective.

The disclosure comprises a unit including a one-piece retaining element, and a bearing unit, which includes at least one outer ring and at least one inner ring, which is rotatable relative to the outer ring, wherein the bearing unit is captivity attached to the retaining element, and the retaining element surrounds the outer ring in its circumferential direction at least in large part, wherein the retaining element includes at least one region, which projects into a groove of the outer ring.

The unit includes at least one attachment element, which abuts on the retaining element and at least contributes to the attaching of the bearing unit to the retaining element. That the retaining element is "one-piece" is to be understood in particular to mean that all regions of the retaining element are materially connected to one another and/or the retaining element is made from one casting. That the retaining element "surrounds at least in large part" the outer ring in its circumferential direction is to be understood in particular to mean that with respect to a center of mass of the bearing unit the retaining element surrounds the outer ring at least over an angular range of at least 200°, preferably at least 270°, particularly preferably at least 330°, and in particular over 360°. Using an inventive design a unit of the above-described type can be provided, which guarantees a very reliable attaching of the bearing unit to the retaining element, in particular when this is comprised of a soft material, and which is cost-effective. In particular, in comparison to the design in DE 10 2004 031 830 A1 it can be achieved that wider stamping tools can be used for generating the region that engages into the groove, since the region can already be generated before the bearing is mounted onto the retaining element. Due to the use of a wider stamping tool a significantly longer service life thereof can be achieved, since it is more stable and subject to less wear. In particular, even in the case wherein the retaining element is comprised of a soft material, a secure attaching of the bearing unit can be achieved, since the region that engages into the groove need not be snapped-on onto the retaining element for attaching the bearing unit, whereby a shearing-off of the region is safely prevented. In particular, fewer regions of the retaining element need be generated that engage into the groove, which also reduces the wear of stamping tools.

In another aspect, the disclosure includes an assembly comprising a retainer comprising a body having a first side and a second side and a substantially circular through-hole extending from the first side to the second side. The through-hole has a center axis, and the body has an axial thickness from the first side to the second side. A boundary of the through-hole including two or fewer recesses, and each of the two or fewer recesses includes a mounting tongue that is spaced axially inward from the first side and from the second side and has an axial thickness less than the axial thickness of the retaining element. The boundary of the through-hole further includes at least one radial inward projection. The assembly also includes a bearing assembly having an inner ring and an outer ring, the outer ring including a groove in a radially outer surface, and the bearing assembly is mounted in the through-opening such that the at least one radial inward projection extends into the groove. The assembly also includes an attachment element having a channel mounted in each of the two or fewer recesses such that the mounting tongue of each of the two or fewer recesses is received in the channel, and the attachment element also includes a pawl engaging the groove.

Preferably the attachment element at least contributes to an interference-fit attaching of the bearing unit to the retaining element with respect to an axial direction of the bearing unit.

The attachment element advantageously includes at least one bracket-shaped region which surrounds a part of the retaining element.

The attachment element may include at least one latching lug, using which the attachment element is attached to the retaining element.

The attachment element is preferably comprised of metal and/or plastic.

Furthermore a retaining element may include an essentially circular through-hole, wherein a boundary of the through-hole includes at most two recesses, in particular at most one recess, that each extend, in a radial direction with respect to a center point of the circular through-hole, away from the centerpoint. In particular it is conceivable that the boundary of the through-hole does not extend completely by 360° about the centerpoint but rather includes at least one interruption.

Further advantages arise from the following description of the drawings. Exemplary embodiments of the invention are depicted in the drawings. The drawings, the description, and the claims contain numerous features in combination. The person skilled in the art will also advantageously consider the features individually and combine them into further meaningful combinations.

DETAILED DESCRIPTION

Figure 1:
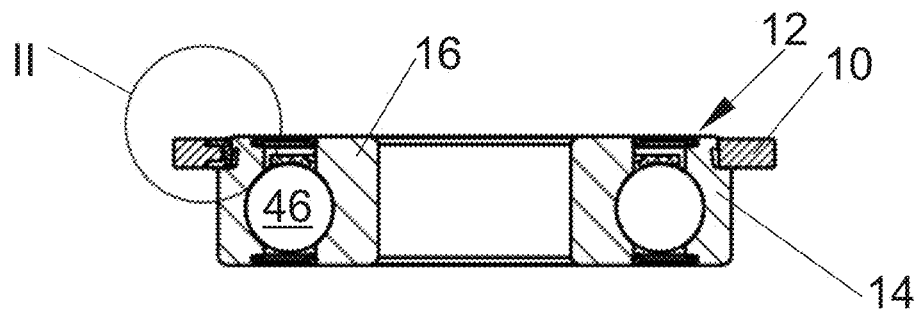
FIG. 1 is a cross-section through a bearing retaining element having an attaching element according to an embodiment of the present disclosure.
Figure 2:
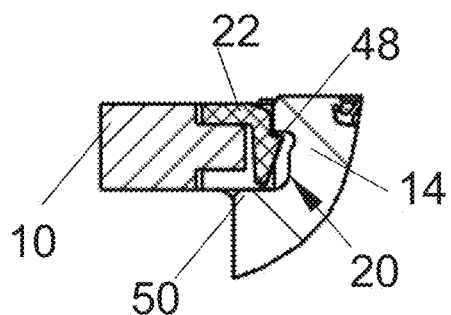
FIG. 2 is a detail view of region II from FIG. 1.
Figure 3:
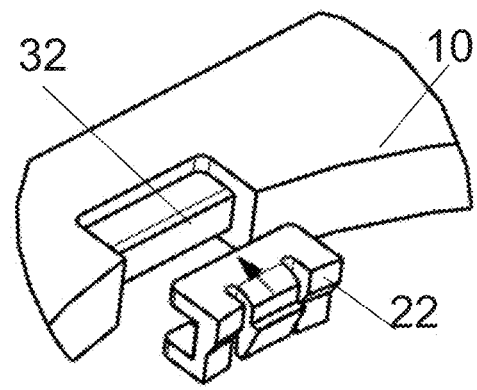
FIG. 3 illustrates the installation of the attachment element of FIG. 1.
Figure 4:
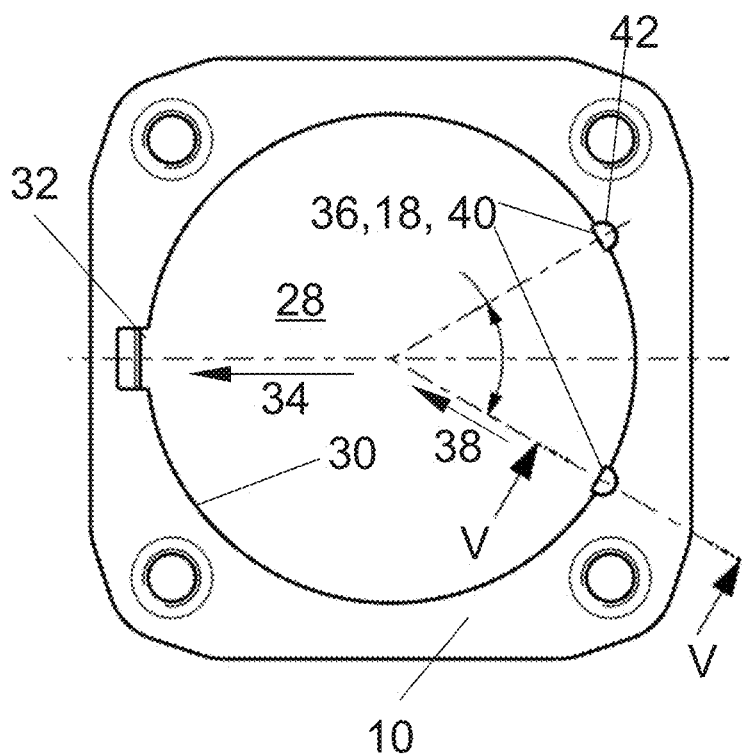
FIG. 4 is a plan view of the retaining element of FIG. 1.
Figure 5:
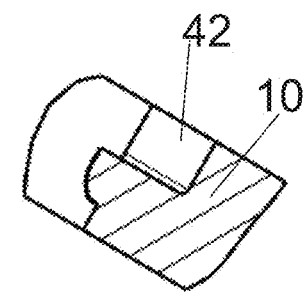
FIG. 5 is a cross-section through an embossing region of the retaining element of FIG. 4.

FIG. 1 shows an inventive unit in a fully installed state. The unit includes a one-piece retaining element 10 and a bearing unit 12, which includes an outer ring 14, an inner ring 16, and rolling elements 46, in the present case balls. The inner ring is rotatable relative to the outer ring. Furthermore, the bearing unit formed as a ball bearing is captivity attached to the retaining element. The retaining element is made of metal and is plate shaped. Furthermore the retaining element completely surrounds a radially outer lying region of the outer ring (FIGS. 1-5 and 7-9).

The retaining element includes a through-hole 28, which is bounded by a boundary 30 of the retaining element. The retainer comprises a recess 32, which extends, in a radial direction 34 with respect to a centerpoint of the essentially circular through-hole 28, away from the centerpoint. The boundary further includes two regions 18, which engage into a groove 20 of the outer ring when the bearing unit is mounted onto the retaining plate. The regions 18 each form an elevation 36, which, emanating from a circular basic shape of the boundary, extends toward the centerpoint in a radial direction 38 with respect to the centerpoint. The groove extends over 360° to an outer surface of the outer ring.

The unit includes an attachment element 22, which abuts on the retaining element and contributes to an interference-fit attaching of the bearing unit to the retaining element with respect to an axial direction of the bearing unit. For this purpose the attachment element includes a bracket-shaped region 24, which surrounds a part of the retaining element. The attachment element is thereby attached to the retaining element in an interference-fit manner with respect to axial directions of the bearing unit. In the present exemplary embodiment the attachment element is comprised of plastic. In addition, the attachment element includes a latching hook 48, which also engages into the groove 20 and thereby prevents, in cooperation with the regions 18, a relative movement of the retaining element in a first axial direction relative to the bearing unit. A relative movement of the retaining element in a second axial direction relative to the bearing unit is prevented such that with an exerting of a force onto the retaining element, which could cause such a movement, a shoulder 50 of the outer ring pushes against the retaining element and thereby prevents the movement.

The unit can be part of a motor vehicle transmission, in particular of an automobile transmission.

Figure 7:
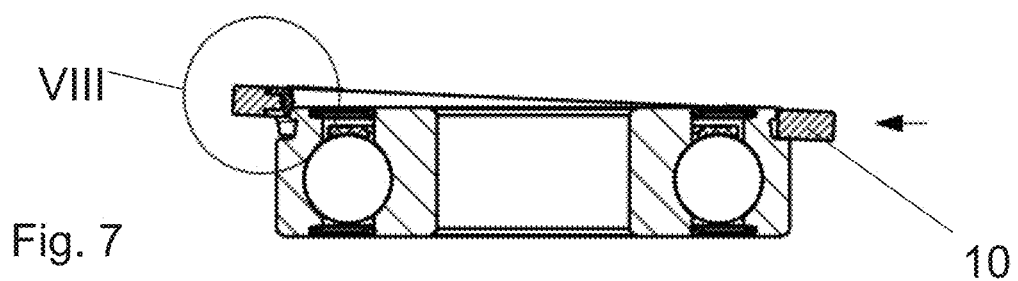
FIG. 7 illustrates the installation of the retaining unit.
Figure 8:
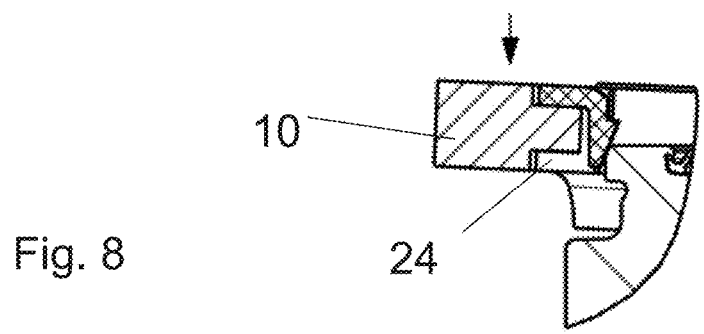
FIG. 8 is a detail view of region VII from FIG. 7.
Figure 9:
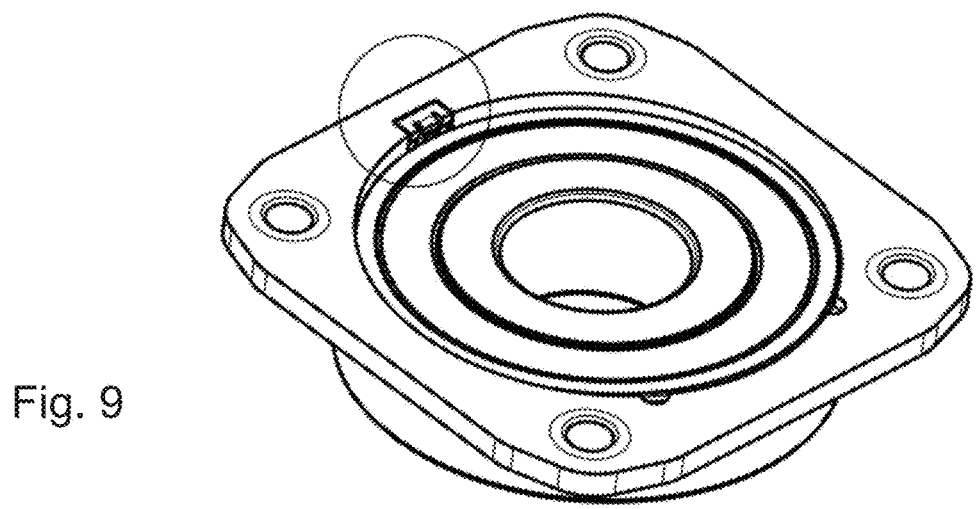
FIG. 9 is a perspective depiction of the retaining unit in the position of FIG. 7.

In a method for installing the unit initially the regions 18 that each form lugs 40 are formed by embossing, and the lugs are subsequently at least partially introduced into the groove 20 of the outer ring The introducing of the lugs is effected by the retaining element being moved toward the bearing unit slightly tilted relative to the bearing unit in a relative movement oblique to an axial direction of the baring unit (FIG. 7-9). The attachment element is attached beforehand to the retaining element by its bracket-shaped region. Finally by exerting an axial pressure onto the retaining element the latching hook 48 is furthermore deflected in the radial direction, with the result that the latching hook partially snaps-in into the groove 20 when the retaining element pushes onto the shoulder during its relative movement with respect to the outer ring in the vicinity of the attachment element 22.

Alternative exemplary embodiments are depicted in FIGS. 6 and 10-17. Components, features, and functions remaining essentially identical are generally numbered with the same reference numbers. However, to differentiate the exemplary embodiments the letters "a," "c," etc. are added to the reference numbers of the exemplary embodiments in FIGS. 6 and 10-17. The following description is essentially limited to the differences to the exemplary embodiment in FIGS. 1-5 and 7-9, wherein with respect to components, features, and functions remaining the same, reference can be made to the description of the exemplary embodiment in the FIGS. 1-5 and 7-9.

Figure 6:
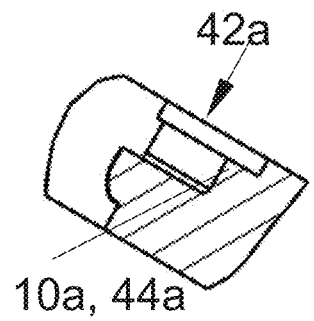
FIG. 6 is a cross-section through an alternative embossing region of the retaining element.

FIG. 6 shows an alternative exemplary embodiment of an embossing region 42a, which has arisen by having been embossed twice. The shoulder 44a is thereby formed.

Figure 10:
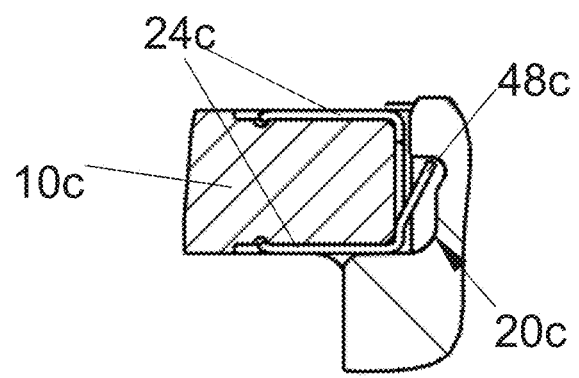
FIG. 10 is a section of a partial section through an alternative exemplary embodiment of a retaining unit according to the disclosure.
Figure 11A:
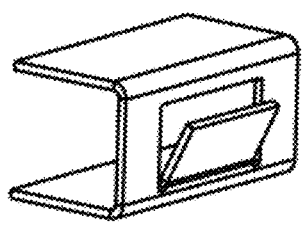
FIGS. 11A-11G illustrate alternative embodiments of attachment elements according to the disclosure.
Figure 11A:
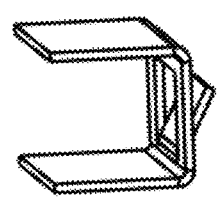
Figure 11B:
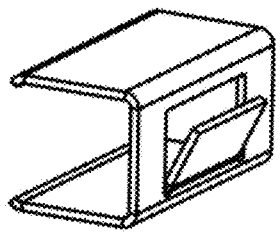
Figure 11B:
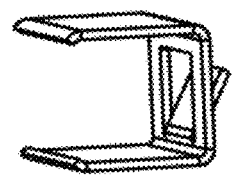
Figure 11C:
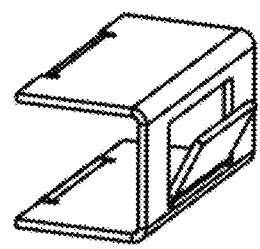
Figure 11C:
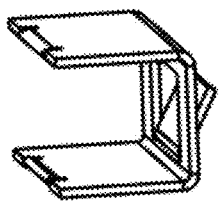
Figure 11D:
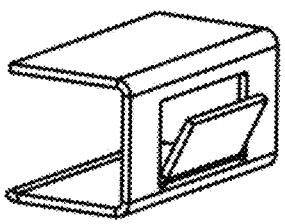
Figure 11D:
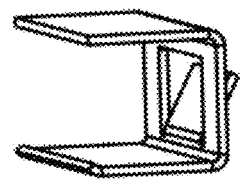
Figure 11E:
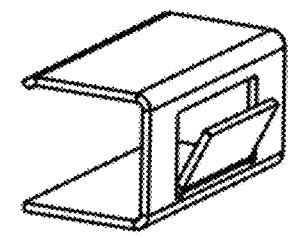
Figure 11E:
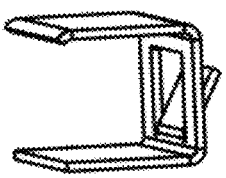
Figure 11F:
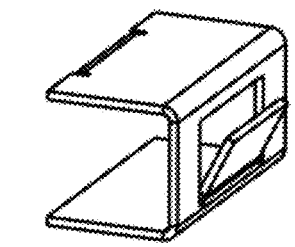
Figure 11F:
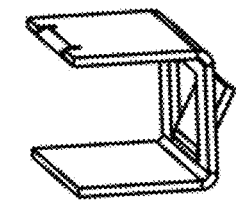
Figure 11G:
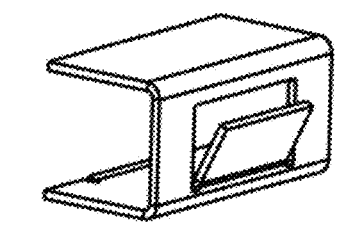
Figure 11G:
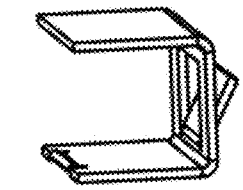

FIG. 10 shows an alternative exemplary embodiment of an inventive unit, wherein the retaining element 10c and the attachment element 24c differ from the above-described exemplary embodiment. On its top side and its bottom side the retaining element respectively includes a shoulder embossment wherein a recess is respectively disposed. During its installation the attachment element is pushed onto the shoulder embossments, wherein the attachment element respectively includes inwardly facing lips respectively on end regions of arms of its bracket-shaped region, which lips run into the recesses during the pushing-on, with the result that the attachment element is locked onto the retaining element. The attachment element is made of metal.

FIG. 11 shows alternative embodiments of attachment elements. Adjacently depicted attachment elements are each different perspective depictions of the same component.

Figure 12:
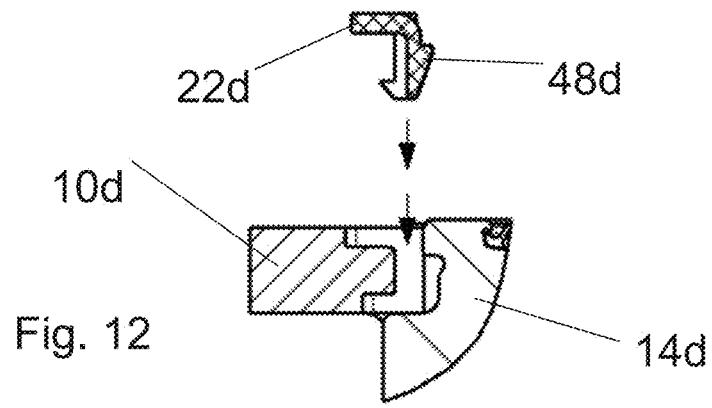
FIGS. 12, 13A, 13B and 14 show a third alternative exemplary embodiment of a retaining unit according to an embodiment of the disclosure.
Figure 13A:
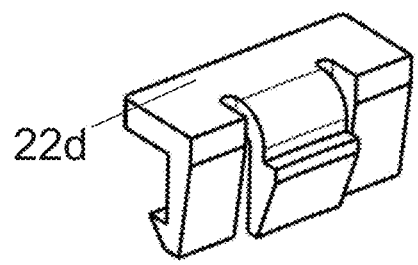
Figure 13B:
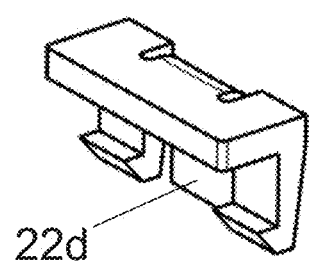
Figure 14:
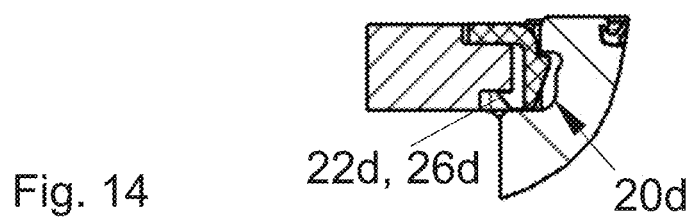

FIGS. 12-14 illustrate a further alternative exemplary embodiment of an inventive unit. The attachment element 22d includes a latching lug 26d. During an installing of the unit the retaining element 10d is placed on the outer ring 14d such that the retaining element is not tilted relative to the outer ring. While the retaining element and the outer ring are at rest relative to each other, the attachment element is inserted between the retaining element and the outer ring, wherein the latching hook of the attachment element and the latching lug 26d deform and the latching hook finally protrudes partially into the groove of the outer ring, and the latching lug latches with the retaining element, with the result that both the attachment element and the bearing unit are attached to the retaining element in an interference-fit manner in both axial directions of the bearing unit. The attachment unit is formed from plastic.

Figure 15:
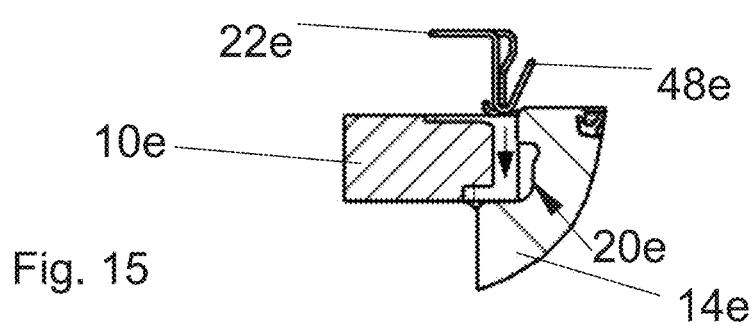
FIGS. 15, 16A, 16B and 17 show a fourth alternative exemplary embodiment of an inventive unit.
Figure 16A:
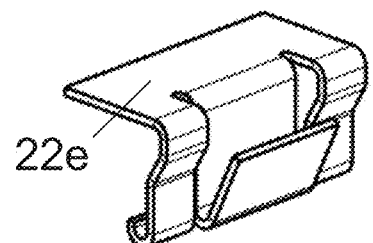
Figure 16B:
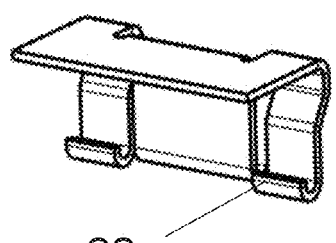
Figure 17:
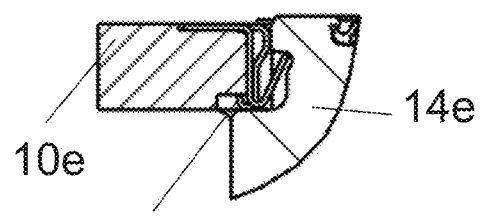

FIGS. 15-17 show a further alternative exemplary embodiment of an inventive unit, wherein the attachment element 22e is functionally constructed like the exemplary embodiment described directly above, and the essential difference consists in that the attachment element 22e is made of metal.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing retaining units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Retaining element
12 Bearing unit
14 Outer ring
16 Inner ring
18 Region
20 Groove
22 Attachment element
24 Region
26 Latching lug
28 Through-hole
30 Boundary
32 Recess
34 Radial direction
36 Elevation
38 Radial direction
40 Lug
42 Embossing region
44 Shoulder
46 Rolling element
48 Latching hook
50 Shoulder

The invention claimed is:

1. An assembly comprising:
a retaining element configured to retain an outer ring of a bearing in a housing, the retaining element comprising a body having a first side and a second side and a substantially circular through-hole extending from the first side to the second side and having a center axis and having an axial thickness from the first side to the second side; and
a bearing unit comprising an outer ring and an inner ring rotatably supported relative to the outer ring, the outer ring having a groove in a radially outer surface, the bearing unit being captively retained in the through-hole by the retaining element,
wherein the retaining element substantially surrounds the outer ring,
wherein a boundary of the through-hole includes at least one projection that projects into the groove, and including
an attachment element mounted in a recess of the boundary of the through-hole, the attachment element being configured to secure the bearing unit to the retaining element.

2. The assembly according to claim 1, wherein the attachment element creates an interference fit between the attachment element and the bearing unit.

3. The assembly according to claim 1, wherein the attachment element includes at least one channel and wherein a portion of the retaining element is located in the at least one channel.

4. The assembly according to claim 1, wherein the attachment element includes at least one latching lug configured to attach the attachment element to the retaining element.

5. The assembly according to claim 1, wherein the attachment element is comprised of metal and/or plastic.

6. The assembly according to claim 1, wherein the attachment element includes a pawl configured to engage the groove to limit axial movement of the bearing unit in the retaining element in at least one direction.

7. The assembly according to claim 6, wherein the recess includes a mounting tongue spaced axially inward from the first side and from the second side and having an axial thickness less than the axial thickness of the retaining element.

8. The assembly according to claim 7, wherein the attachment element includes a channel, the attachment element being mounted in the recess such that the mounting tongue extends into the channel and such that the pawl engages the groove in the bearing unit.

9. A motor vehicle transmission including the assembly according to claim 1.

10. A method comprising the steps of:
providing an assembly according to claim 1;
mounting an attachment element having a pawl in the recess;
providing a bearing having an outer ring and a groove in a radially outer surface of the outer ring; and
placing the bearing in the substantially circular through-hole such that the at least one radial inward projection projects into the groove and such that the pawl extends into the radial groove.

11. An assembly comprising:
a retainer comprising a body having a first side and a second side and a substantially circular through-hole extending from the first side to the second side, the through-hole having a center axis, the body further having an axial thickness from the first side to the second side, a boundary of the through-hole including two or fewer recesses, each of the two or fewer recesses including a mounting tongue, the mounting tongue being spaced axially inward from the first side and from the second side and having an axial thickness less than the axial thickness of the retaining element, the boundary of the through-hole further including at least one radial inward projection;

a bearing assembly having an inner ring and an outer ring, the outer ring including a groove in a radially outer surface, the bearing assembly being mounted in the through-opening such that the at least one radial inward projection extends into the groove; and an attachment element having a channel mounted in each of the two or fewer recesses such that the mounting tongue of each of the two or fewer recesses is received in the channel, the attachment element also including a pawl engaging the groove.

12. The assembly according to claim 11, wherein the attachment element includes a latching lug configured to engage a side of the mounting tongue.

* * * * *